United States Patent
Dusanapudi et al.

(10) Patent No.: US 10,223,225 B2
(45) Date of Patent: Mar. 5, 2019

(54) TESTING SPECULATIVE INSTRUCTION EXECUTION WITH TEST CASES PLACED IN MEMORY SEGMENTS WITH NON-NATURALLY ALIGNED DATA BOUNDARIES

(71) Applicant: International Business Machines Corporation, Armonk, NY (US)

(72) Inventors: Manoj Dusanapudi, Bangalore (IN); Shakti Kapoor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/344,768

(22) Filed: Nov. 7, 2016

(65) Prior Publication Data

US 2018/0129577 A1    May 10, 2018

(51) Int. Cl.
| | |
|---|---|
| *G06F 9/30* | (2018.01) |
| *G06F 11/22* | (2006.01) |
| *G06F 11/26* | (2006.01) |
| *G06F 11/263* | (2006.01) |

(52) U.S. Cl.
CPC .......... *G06F 11/263* (2013.01); *G06F 9/3005* (2013.01); *G06F 9/30058* (2013.01); *G06F 11/2236* (2013.01); *G06F 11/261* (2013.01); *G06F 11/2635* (2013.01)

(58) Field of Classification Search
CPC .. G06F 11/261; G06F 11/263; G06F 11/2236; G06F 11/2635; G06F 9/3005; G06F 9/30058
See application file for complete search history.

(56) References Cited

U.S. PATENT DOCUMENTS

| | | |
|---|---|---|
| 5,165,029 A | 11/1992 | Sawai et al. |
| 5,276,833 A | 1/1994 | Auvinen et al. |
| 5,287,481 A | 2/1994 | Lin |

(Continued)

FOREIGN PATENT DOCUMENTS

| | | |
|---|---|---|
| CN | 103140828 A | 6/2013 |
| EP | 0805390 B1 | 2/2003 |
| KR | 101467623 | 12/2014 |

OTHER PUBLICATIONS

Dusanapudi et al., "Replicating Test Case Data Into a Cache With Non-Naturally Aligned Data Boundaries" U.S. Appl. No. 15/010,051, filed Jan. 29, 2016.

(Continued)

*Primary Examiner* — Paul Contino
(74) *Attorney, Agent, or Firm* — Martin & Associates, LLC; Bret J. Petersen

(57) ABSTRACT

Test cases for testing speculative execution of instructions are replicated into a memory with non-naturally aligned data boundaries to create a non-contiguous instruction stream to efficiently test a processor. Placing test cases with test code and test data in the non-naturally aligned data boundaries as described herein allows test code to test speculative execution of branches. The test case includes a branch with a hint bit set to cause the hardware to mispredict the path of the branch to cause speculative execution of test code, bad code or erroneously execute data. The processor can then be tested to see if it properly flushes the speculatively executed code upon taking the opposite branch of the mispredicted path.

20 Claims, 7 Drawing Sheets

(56) References Cited

U.S. PATENT DOCUMENTS

| | | | |
|---|---|---|---|
| 5,513,344 A | 4/1996 | Nakamura | |
| 5,537,572 A | 7/1996 | Michelsen et al. | |
| 5,539,878 A | 7/1996 | Kikinis | |
| 5,671,231 A * | 9/1997 | Cooper | G11C 29/48 |
| | | | 711/146 |
| 5,704,035 A | 12/1997 | Shipman | |
| 5,745,508 A | 4/1998 | Prohofsky | |
| 5,831,987 A | 11/1998 | Spilo | |
| 6,012,125 A * | 1/2000 | Tran | G06F 9/28 |
| | | | 711/118 |
| 6,044,478 A | 3/2000 | Green | |
| 6,070,238 A | 5/2000 | Feiste et al. | |
| 6,192,515 B1 * | 2/2001 | Doshi | G06F 8/4452 |
| | | | 712/241 |
| 6,594,731 B1 | 7/2003 | Hertwig et al. | |
| 6,658,534 B1 * | 12/2003 | White | G06F 9/3802 |
| | | | 711/125 |
| 6,754,857 B2 | 6/2004 | Liang | |
| 7,133,975 B1 | 11/2006 | Isaac et al. | |
| 7,203,872 B2 | 4/2007 | Frodsham et al. | |
| 7,254,509 B1 * | 8/2007 | Johnson | G01R 31/3187 |
| | | | 702/117 |
| 7,647,539 B2 * | 1/2010 | Bussa | G06F 11/261 |
| | | | 714/11 |
| 7,669,083 B2 * | 2/2010 | Arora | G06F 11/2236 |
| | | | 714/25 |
| 7,743,305 B2 | 6/2010 | Yamada | |
| 7,752,499 B2 * | 7/2010 | Choudhury | G06F 11/263 |
| | | | 714/25 |
| 7,788,610 B2 | 8/2010 | Emek et al. | |
| 7,925,866 B2 | 4/2011 | Greenhalgh et al. | |
| 7,992,059 B2 * | 8/2011 | Anvekar | G06F 11/263 |
| | | | 714/718 |
| 8,015,362 B2 | 9/2011 | Alexander et al. | |
| 8,161,432 B2 | 4/2012 | Wang et al. | |
| 8,161,440 B2 | 4/2012 | Emek et al. | |
| 8,645,669 B2 * | 2/2014 | Alexander | G06F 9/30032 |
| | | | 712/210 |
| 8,726,044 B2 | 5/2014 | Hameed et al. | |
| 9,317,460 B2 | 4/2016 | Greiner et al. | |
| 9,612,929 B1 | 4/2017 | Dusanapudi et al. | |
| 9,665,486 B2 | 5/2017 | Habermann et al. | |
| 9,892,039 B2 | 2/2018 | Luttrell et al. | |
| 2002/0040285 A1 | 4/2002 | Boehm | |
| 2003/0122584 A1 | 7/2003 | Boehm | |
| 2004/0078699 A1 | 4/2004 | Thompson et al. | |
| 2005/0071817 A1 | 3/2005 | DeWitt, Jr. et al. | |
| 2006/0248319 A1 | 11/2006 | Kadambi | |
| 2008/0126771 A1 | 5/2008 | Chen et al. | |
| 2008/0168562 A1 | 7/2008 | Haga et al. | |
| 2008/0258749 A1 | 10/2008 | Yamada | |
| 2009/0024886 A1 | 1/2009 | Arora et al. | |
| 2009/0070532 A1 * | 3/2009 | Bussa | G06F 12/0875 |
| | | | 711/125 |
| 2009/0070570 A1 * | 3/2009 | Choudhury | G06F 11/2236 |
| | | | 712/244 |
| 2009/0070632 A1 | 3/2009 | Bag et al. | |
| 2009/0089564 A1 * | 4/2009 | Brickell | G06F 9/30003 |
| | | | 712/239 |
| 2011/0078521 A1 | 3/2011 | He et al. | |
| 2011/0213926 A1 | 9/2011 | Ledford | |
| 2011/0276764 A1 | 11/2011 | Alexander et al. | |
| 2012/0079346 A1 | 3/2012 | Fukuda | |
| 2012/0102302 A1 * | 4/2012 | Bansal | G06F 9/3804 |
| | | | 712/234 |
| 2012/0221903 A1 * | 8/2012 | Ohnuma | G11C 29/10 |
| | | | 714/720 |
| 2013/0007425 A1 * | 1/2013 | Cantin | G06F 9/3806 |
| | | | 712/240 |
| 2013/0047140 A1 | 2/2013 | Shann et al. | |
| 2013/0339327 A1 * | 12/2013 | Belmar | G06F 17/30371 |
| | | | 707/703 |
| 2014/0032966 A1 | 1/2014 | Dusanapudi et al. | |
| 2014/0129773 A1 | 5/2014 | Habermann et al. | |
| 2014/0195786 A1 | 7/2014 | Gilkerson et al. | |
| 2015/0026445 A1 * | 1/2015 | Bansal | G06F 9/3804 |
| | | | 712/234 |
| 2015/0134933 A1 | 5/2015 | Holm et al. | |
| 2015/0143057 A1 | 5/2015 | Pavlou et al. | |
| 2015/0221396 A1 | 8/2015 | Subramaniam et al. | |
| 2015/0234700 A1 | 8/2015 | Qin et al. | |
| 2015/0347134 A1 | 12/2015 | Gschwind et al. | |
| 2016/0162381 A1 * | 6/2016 | Hendrickson | G01R 31/31813 |
| | | | 714/33 |
| 2016/0349322 A1 | 12/2016 | Shibahara et al. | |
| 2018/0146454 A1 | 5/2018 | Wang et al. | |

OTHER PUBLICATIONS

Dusanapudi et al., "Replicating Test Case Data Into a Cache With Non-Naturally Aligned Data Boundaries" U.S. Appl. No. 15/065,279, filed Mar. 9, 2016.

Dusanapudi et al., "Replicating Test Case Data Into a Cache With Non-Naturally Aligned Data Boundaries" U.S. Appl. No. 15/244,799, filed Aug. 23, 2016.

Dusanapudi et al., "Replicating Test Code and Test Data Into a Cache With Non-Naturally Aligned Data Boundaries" U.S. Appl. No. 15/152,430, filed May 11, 2016.

Dusanapudi et al., "Replicating Test Case Data Into a Cache and Cache Inhibited Memory" U.S. Appl. No. 15/207,669, filed Jul. 12, 2016.

Dusanapudi et al., "Stress Testing a Processor Memory With a Link Stack" U.S. Appl. No. 15/458,118, filed Mar. 14, 2017.

Dusanapudi et al., "Stress Testing a Processor Memory With a Link Stack" U.S. Appl. No. 15/804,512, filed Nov. 16, 2017.

IBM, Appendix P—List of IBM Patents or Patent Applications Treated As Related, dated Jan. 31, 2018.

Mutlu, Onur. 15-7 40/18-7 40 Computer Architecture Lecture 24: Prefetching. Carnegie Melon University, 2011.

Jegou, Yvon, and Olivier Temam. "Speculative Prefetching", Proceedings of the 7th International Conference on Supercomputing, ACM, 1993.

Prefetch Distance. High Performance Computer Architectures: A Historical Perspective. [retrieved on Mar. 19, 2018]. Retrieved from the Internet <URL:http ://homepages.inf.ed.ac.uk/cgi/mi/comp-arch. pl ?Stores/pref-dist.html,Stores/pref-dist-f.html,Stores/menu-pre. html>, 1996.

Appendix P—List of IBM Patents or Patent Applications Treated As Related, dated Mar. 15, 2017.

Eichenberger et al., Vectorization for SIMD Architectures with Alignment Constraints. ACM, PLDI'04, p. 82-93, Jun. 2004.

Adir et al., Genesys-Pro: Innovations in Test Program Generation for Functional Processor Verification. IEEE Design & Test of Computers, p. 84-93, 2004.

English Abstract of Korean Patent No. 101467623.

Zhu et al., "Class-based Cache Management for Dynamic Web Content." Twentieth Annual Joint Conference of the IEEE Computer and Communications Societies, IEEE INFOCOM 2001.

Lundqvist, Thomas, Data Cache Timing Analysis with Unknown Data Placement. vol. 9. Technical Report 02-11, Department of Computer Engineering, Chalmers University of Technology, Göteborg, Sweden, 2002.

McKinney et al. "DECchip 21066: the Alpha AXP Chip for Cost-Focused Systems." Compcon Spring'94, IEEE, 1994.

Maman, et al. "Reusable On-Chip System Level Verification for Simulation Emulation and Silicon." 2006 IEEE International High-Level Design Validation and Test Workshop, 2006.

Kadry et al. "Improving Post-silicon Validation Efficiency by Using Pre-generated Data." Hardware and Software: Verification and Testing, Springer International Publishing, p. 166-181, 2013.

English Abstract for Chinese Patent CN103140828A, Jun. 5, 2013.

Lozano et al., A Deeply Embedded Processor for Smart Devices, Smart Computing Workshops (SmartComp 2014) p. 79-86, 2014.

IBM, "Method and apparatus for branch recovery in out of order dispatch and out of order retire instruction stream environment", IPCOM000125694D, Jun. 13, 2005.

(56) References Cited

OTHER PUBLICATIONS

Disclosed Anonymously, :Method and System for Defining a Stack Model and Tracking Changes to a Test Execution Stack, IPCOM000199695D, Sep. 15, 2010.

Disclosed Anonymously, "Method and System for Controlling Cache Interaction Among Arbitrary Hardware Verification Tools", IPCOM000196688D, Jun. 11, 2010.

Gay et al., Stack Allocating Objects in Java, retrieved from: citeseerx.ist.psu.edu, Jan. 1999.

Disclosed Anonymously, "A method and system to intelligently evolve test cases", IPCOM000240119D, Jan. 5, 2015.

Dusanapudi et al., "Replicating Test Case Data Into a Cache With Non-Naturally Aligned Data Boundaries" U.S. Appl. No. 15/887,968, filed Feb. 2, 2018.

IBM, Appendix P—List of IBM Patents or Patent Applications Treated As Related, dated Mar. 2, 2018.

\* cited by examiner

TESTING SPECULATIVE INSTRUCTION EXECUTION WITH TEST CASES PLACED IN MEMORY SEGMENTS WITH NON-NATURALLY ALIGNED DATA BOUNDARIES

BACKGROUND

1. Technical Field

This disclosure generally relates to computer hardware testing and development, and more specifically relates to a system and method for testing speculative instruction execution in a processor with test cases placed in memory segments with non-naturally aligned data boundaries of the memory.

2. Background Art

Processor testing tools attempt to generate the most stressful test case for a processor. In theory, the generated test case should provide maximum test coverage and should be able to stress various timing scenarios and operations on the processor, including the coherency of cache memory. Building test cases to thoroughly test a processor can be extremely costly in time and resources, thus building efficient test cases that can reuse test code is an important goal of processor testing.

Executing instructions out of sequential order can increase a superscalar processor's performance by allowing the superscalar processor to keep multiple execution units operating in parallel thereby improving throughput. Accordingly, a dispatcher for a superscalar processor can improve overall performance by determining which instructions can be executed out-of-order and providing, or dispatching, those instructions to appropriate pipelines for execution units. When a branch instruction is encountered, the dispatcher must predict which direction the branch will take. If the dispatcher mispredicts the direction the branch will take, the processor must flush the code that was speculatively executed by the mispredicted branch. Testing that the processor properly handles mispredicted branches is an important part of testing a processor design and manufacture.

BRIEF SUMMARY

Test cases for testing speculative execution of instructions are replicated into a memory with non-naturally aligned data boundaries to create a non-contiguous instruction stream to efficiently test a processor. Placing test cases with test code and test data in the non-naturally aligned data boundaries as described herein allows test code to test speculative execution of branches. The test case includes a branch with a hint bit set to cause the hardware to mispredict the path of the branch to cause speculative execution of test code, bad code or erroneously execute data. The processor can then be tested to see if it properly flushes the speculatively executed code upon taking the opposite branch of the mispredicted path.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

Figure 3:
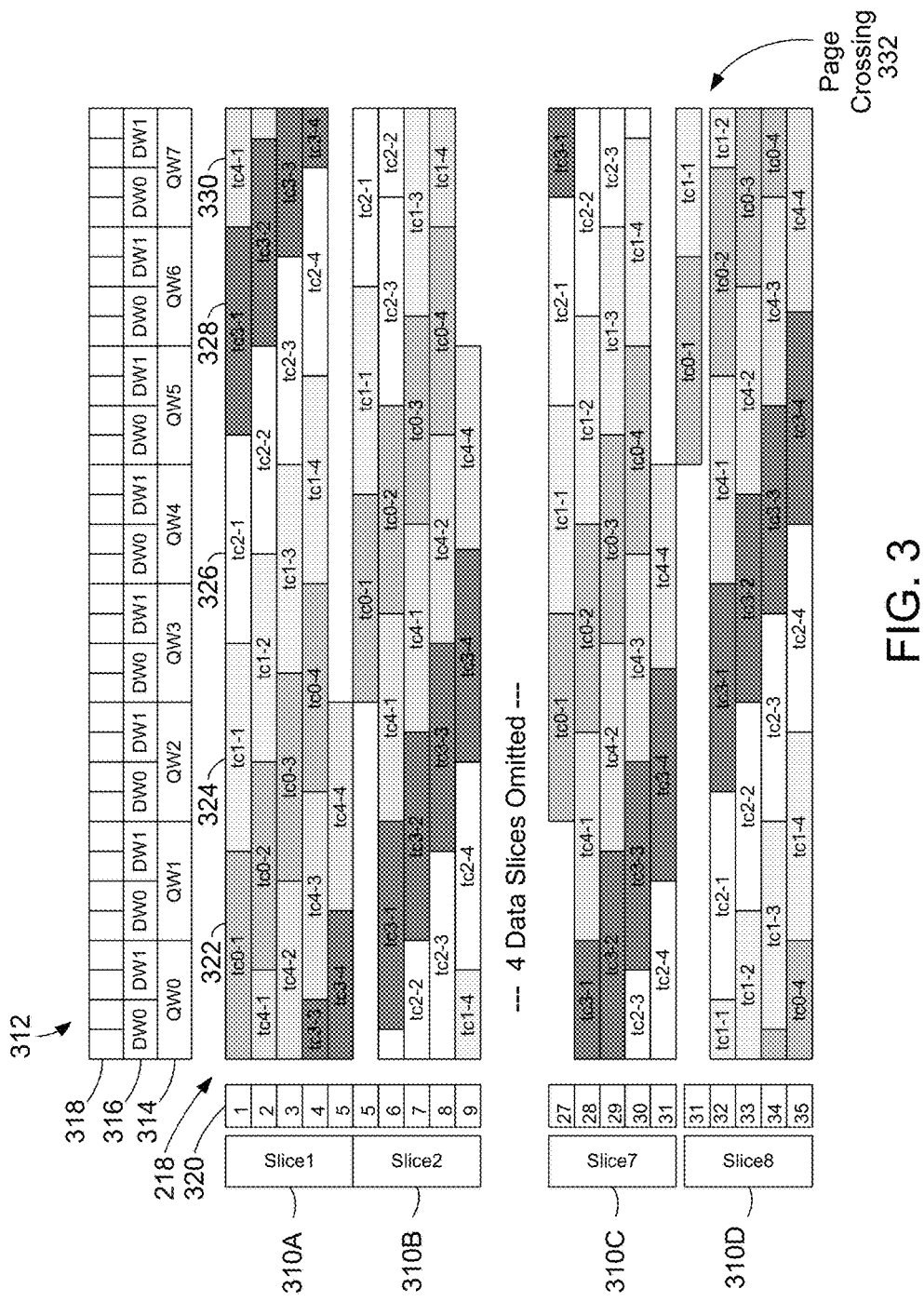
FIG. 3 illustrates successive slices of replicated segment for with test cases stored in a memory cache with non-naturally aligned data boundaries.
Figure 4:
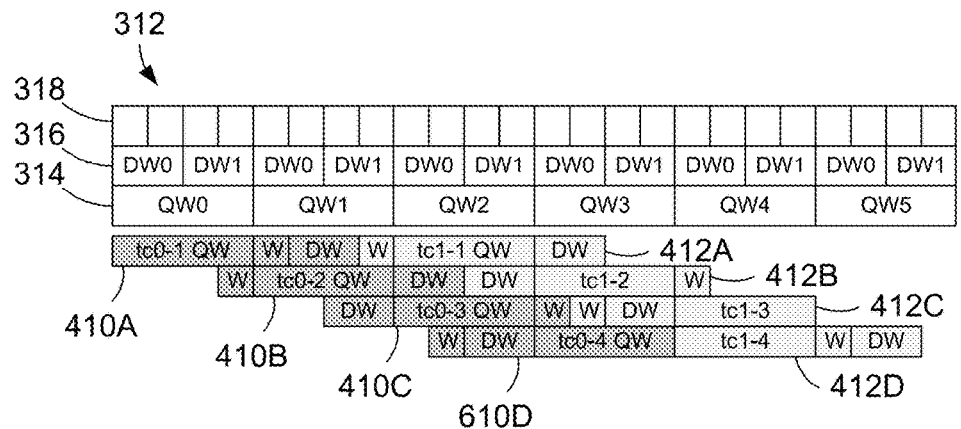
Figure 5A:
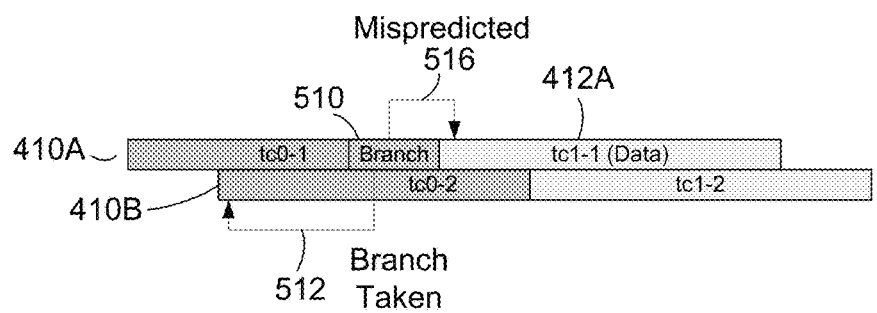
Figure 5B:
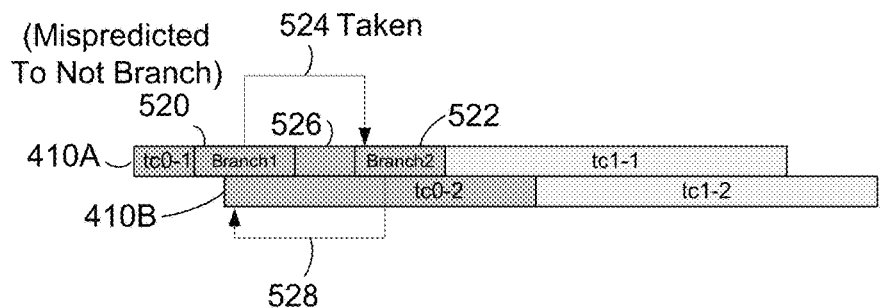
Figure 5C:
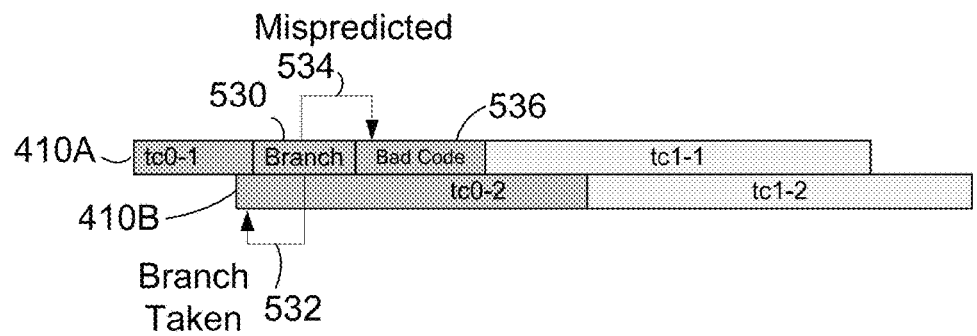
Figure 6:
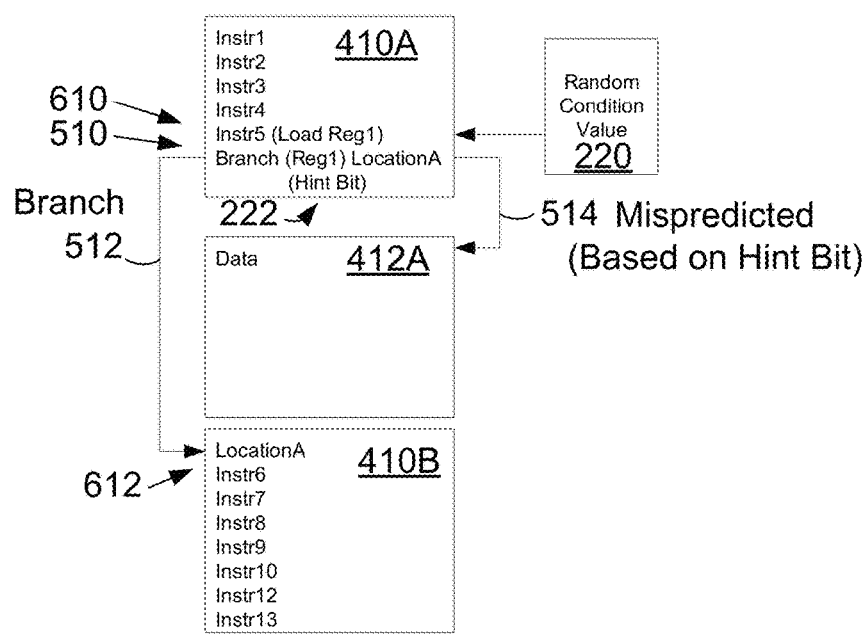
Figure 7:
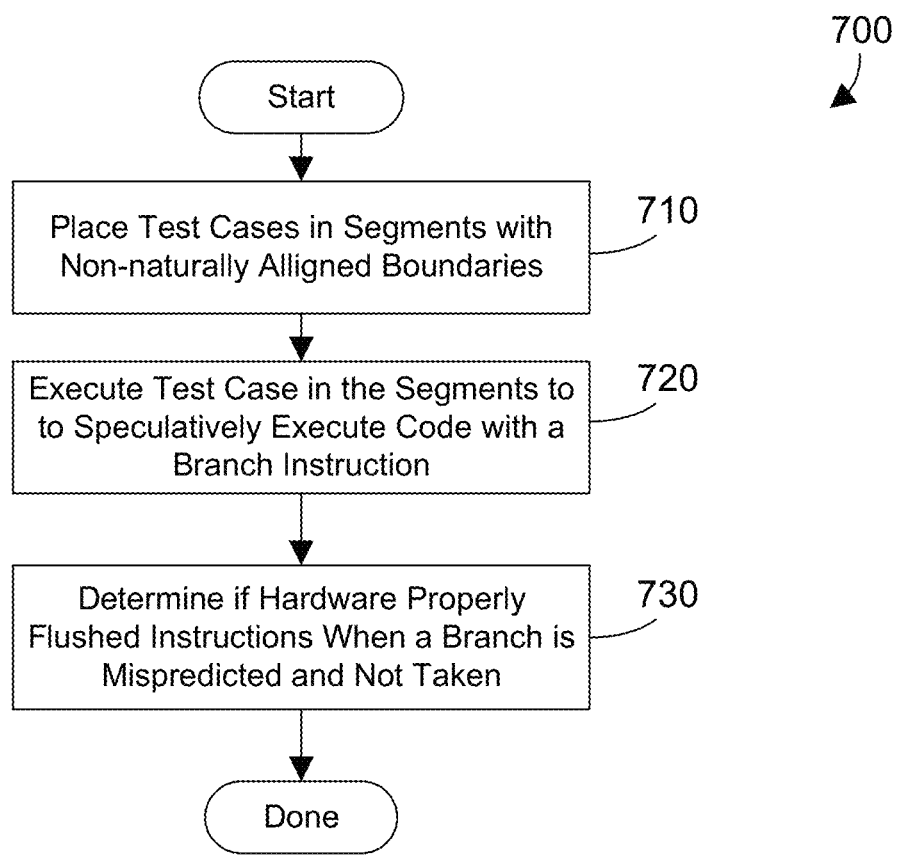
Figure 8:
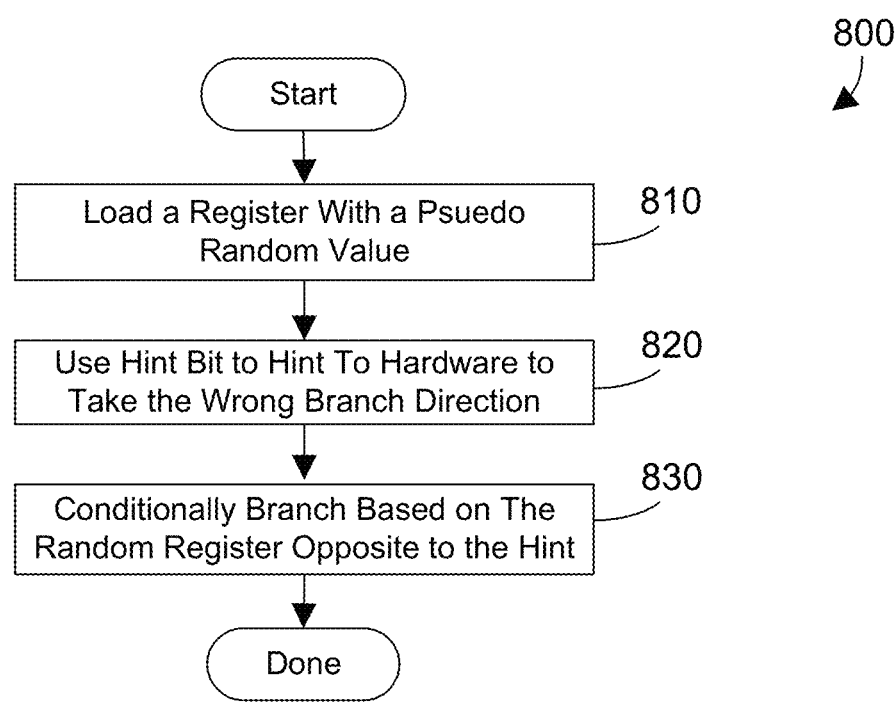

FIG. 4 further illustrates the segments of memory cache for test cases FIG. 3 having non-naturally aligned data boundaries;

FIG. 5A illustrates a first example of a test case in a memory segment of a memory cache with non-naturally aligned data boundaries where the processor mispredicts a branch that will not be taken;

FIG. 5B illustrates a second example of a test case in a memory segment of a memory cache with non-naturally aligned data boundaries where the processor mispredicts a branch will not be taken that is then taken;

FIG. 5C illustrates a third example of a test case in a memory segment of a memory cache with non-naturally aligned data boundaries where the processor mispredicts a branch will not be taken that is then taken and the mispredicted branch is within the same segment as the branch instruction;

FIG. 6 illustrates an example of the test code shown in FIG. 5A;

FIG. 7 is a flow diagram of a method for testing speculative execution of a branch in a test segment having non-naturally aligned data boundaries; and FIG. 8 is a flow diagram of a specific method for step 730 in FIG. 7.

DETAILED DESCRIPTION

The disclosure and claims herein relate to a system and method for testing speculative execution of instructions replicated into a memory with non-naturally aligned data boundaries to create a non-contiguous instruction stream to efficiently test a processor. Placing test cases with test code and test data in the non-naturally aligned data boundaries as described herein allows test code to test speculative execution of branches. The test case includes a branch with a hint bit set to cause the hardware to mispredict the path of the branch to cause speculative execution of test code, bad code or erroneously execute data. The processor can then be tested to see if it properly flushes the speculative code execution upon taking the opposite branch of the mispredicted path.

Figure 1:
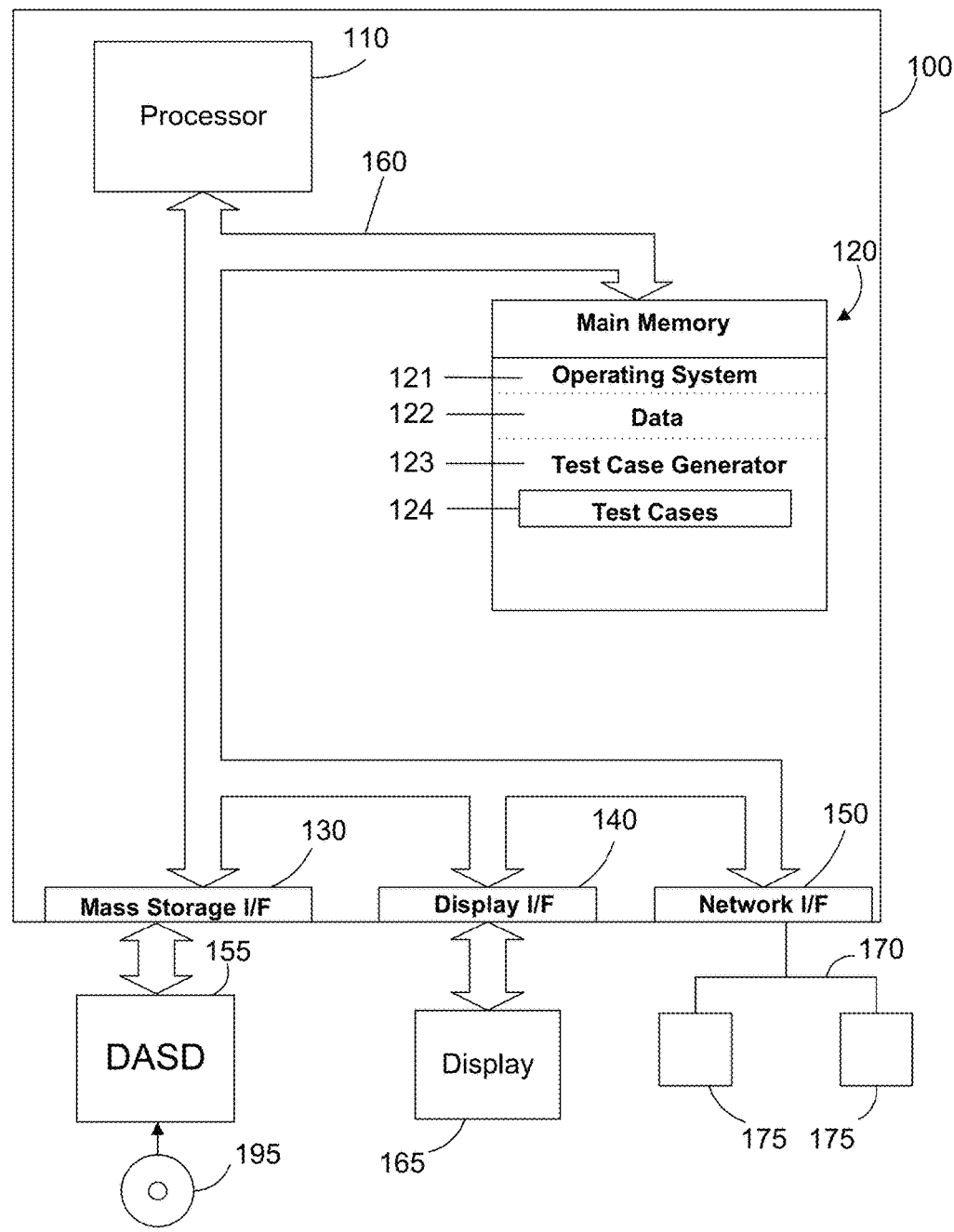
FIG. 1 is a block diagram a computer system with a test case generator as described herein to generate test cases and place them in segments of a data cache with non-naturally aligned data boundaries.

Referring to FIG. 1, a computer system 100 is one suitable implementation of a computer system that is capable of performing the computer operations described herein including a test case generator for generating test cases for verifying and validating a processor design and/or a test case executor as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195. Some devices may have a removable memory card or similar for a direct access storage device 155 instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes data 122, and a test case generator 123. The memory 120 also includes tests cases 124 which are typically created by the test case generator 123 and a user.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, data 122, test case generator 123, and test cases 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the test case generator 123 to generate the test cases 124 as directed by a user.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
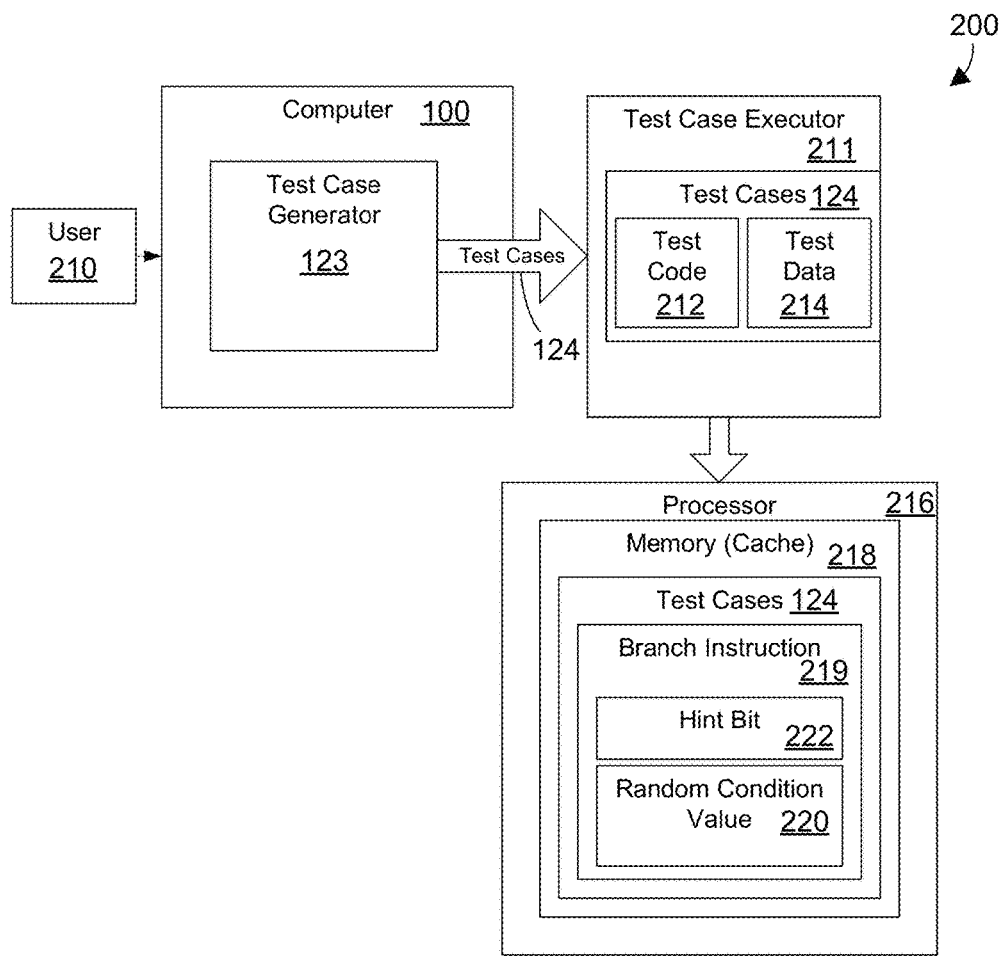
FIG. 2 illustrates simplified block diagrams of a system for testing a processor with test cases placed in segments of a memory cache with non-naturally aligned data boundaries.

FIG. 2 illustrates a simplified block diagram of a system 200 for reducing the time needed to generate test cases for testing speculative instruction execution in a processor with test cases placed in memory with non-naturally aligned data boundaries of the memory. A user 210 uses the test case generator 123 to provide tests cases 124 to a test case executor 211. The test case generator 123 and the test case executor 211 operate in a manner similar to the prior art except as described herein. The test cases 124 may include test code 212 and test data 214. The test case executor 211 loads the test cases 124 into a processor 216 to verify and validate the processor design. The test case executor 211 may replicate the test cases 124, placing multiple copies of the test cases into the memory cache 218, and then the test code 212 of the test cases 124 is executed by the processor to test proper handling of speculative instruction execution as described further below.

Again referring to FIG. 2, the processor 216 has a typical memory design which may include one or more caches. In the illustrated example, the processor 216 has a memory 218. The test cases 124 are placed in the memory 218 by the test case executor 211. The memory 218 may comprise one or more levels of cache. When data or instructions are needed by the processor, the processor first looks to caches as known in the prior art. The test cases described herein test that the processor properly loads and executes test code and test data in the levels of cache memory. In the illustrated example, the test case executor 211 loads a test case 124 into the memory 218 which includes a branch instruction 219 as part of the test code 212 to create a non-contiguous instruction stream. The branch instruction 219 may include a random condition value 220 and a hint bit 222 as described herein. The hint bit 222 is part of the branch instruction 219 and is typically encoded into the branch instruction of the code by a compiler in a manner known in the prior art. The hint bit 222 hints to the processor whether the branch of the branch instruction 219 is likely to be taken or not taken to increase the likelihood that the instruction pipeline will predict the correct path in the instruction pipeline.

Again referring to FIG. 2, the branch instruction 219 in the test cases 124 may further include a random condition value 220. The random condition value 220 may be data loaded from any suitable processor register that can be used for a conditional branch instruction. In the illustrated example, the random condition value 220 is randomized in a manner know in the prior art. With random contents in the random condition value 220, the processor may take the branch or not take the branch in a random manner as described further below.

As introduced above, the test cases 124 are designed to be executed by the processor to test proper handling of speculative instruction execution in the cache memory. Some processors implement a sector design where each cache line can be internally sub-divided into sectors (for example, a 32 Byte sector size in a 128 Byte cache line). This can allow the processor to send a critical sector first and then the remaining sectors later to increase the speed of feeding cache lines from level two cache to level one cache. This arrangement of sub sectors with 28 bytes means the sub sectors can cross physical 32 Byte boundaries (aligned 32 byte) and lie on two different sectors. During speculative execution the processor may give one sector to the execution cache and another sector to data cache. After speculation execution is corrected and flushed, the sub sectors must be in the proper instruction cache or data cache. Testing speculative execution with branch instructions as described herein insures that the processor logic correctly handles these scenarios across cache line boundaries described below. Similarly, placing test cases with branch instructions in data segments with non-naturally aligned boundaries can make the test case cross different cache lines. When a branch is mispredicted it causes a wrong cache line to be loaded. Using mispredicted branch instruction as described below further insures that the processor is tested across cache line boundaries.

FIG. 3 illustrates details of successive slices of cache 218 with replicated test cases (tc0-1, tc1-1, etc.) placed in segments of memory with non-naturally aligned data boundaries. Thus, FIG. 3 represents a simplified representation of a portion of the memory or cache 218 introduced above. In the illustrated example, the cache 218 illustrates four replicated slices 310 that can contain test code or test data (described further below). The table 312 above the memory data illustrates how the cache lines of the cache 218 are divided. A cache line in the cache is divided into eight quad words 314. The quad words 314 are labeled QW0 through QW7. Each quad word 314 is divided into two double words 316. The double words for each quad word are labeled DW0 and DW1. Each double word 316 is further divided into two words 318 (not labeled). In this example, each word is four bytes of memory space. Thus each cache line has eight quad words with 128 bytes of memory. Thus the cache 218 is divided into cache lines with 128 bytes in each line. In the illustrated portion of the cache 218 shown in FIG. 3, lines 1-9 and 27-35 are shown with the cache line number 320 shown for each cache line at the left side of the drawing.

Again referring to FIG. 3, the memory represented in the cache 218 is divided into slices 310 as shown. For simplification of the drawing, only four slices of the memory cache are actually shown. Slices 3 through 6 are omitted from the drawing but follow the same pattern as the other slices. Slice1 310A begins on line1 of the cache and ends near the middle of line 5. Line 5 is shown twice at the left of the drawings. This is done for illustration so that it can be clearly seen where slice1 310A ends and slice2 310B begins. In the cache there is actually only one line of memory designated as line 5. Slice2 310B begins at the end of slice1 310A near the middle of line 5 and ends near the end of line 9. Slice7 310C begins at the end of slice6 (not shown) near the middle of line 27 and ends near the end of line 31. Slice8 310D begins at the end of slice7 310C near the middle of line 31 and ends at the end of line 35.

Again referring to FIG. 3, each slice of memory 310 includes several strands of test cases. In this example, there are five strands of test cases (tc0 through tc4) divided into four segments each. The segments of each strand are shown with the same shading in FIG. 3. The segment of the strand is indicated by the number after the dash. Thus tc0-1 322 is the first segment of test case zero, tc1-1 324 is the first segment of test case one, tc2-1 326 is the first segment of test case 2, tc3-1 328 is the first segment of test case 3 and tc4-1 330 is the first segment of test case four. Test case zero (tc0) includes tc0-1, tc0-2, tc0-3 and tc0-4. Similarly the other test case strands include four segments. As can be seen in the table 312 above the cache, each of the segments has a test case that is seven words long. It is important to note that the seven word length of the segments means that each of the test cases are on non-naturally aligned word boundaries. In this example this means that the beginning and end of each of the test case segments does not line up with 32 byte, cache line (128 byte) and page crossing boundaries. For example, the page crossing boundary 332 is within the test case tc1-1 at the boundary between line 31 and line 32 as shown in FIG. 3. Since the segments are non-naturally aligned, after replication alignment boundaries change for tests on subsequent segments to allow more robust testing of the processor using the same repeated test code. In cases where alignment boundaries need to be respected for a few instructions, these instructions are placed in sub-segments with special alignment locations so that they preserve alignment even after replication and re-execution on new segments as described below.

FIG. 4 further illustrates a portion of the memory cache shown in FIG. 3 having test cases with test code on non-naturally aligned data boundaries. FIG. 4 illustrates the first two strands of the five strands of test cases shown in FIG. 3, namely tc0 610 and tc1 412. Test case zero (tc0) 610 includes four segments 410A, 410B, 410C and 410D. Similarly, test case one (tc1) 612 includes four segments 412A, 412B, 412C and 412D. As described above, each segment of the cache has a test case that is seven words long. The test case segment is divided into three sub-segments. In this example, the sub-segments include a quad word, a double word and a single word for a total of seven words. The order of the sub-segments changes for each segment in the test case strand in order that the test cases within the strings can observe word boundaries where needed. The first segment 410A of test case zero (tc0) has a quad word followed by a word and then a double word. In the next segment of tc0 410B there is a word, a quad word and then a double word. In the next segment of tc0 410C there is a double word, a quad word and then a single word. In the final segment of tc0 410D there is a single word, a double word and then the quad word. Similarly the tc1 alternates the single word, double word and quad word in subsequent segments as shown in 412A, 412B, 412C and 412D.

In the example described above, each segment of the test cases has seven words to ensure that the test case data has non-naturally aligned data boundaries. By having non-naturally aligned data boundaries for each segment of the slice of test data, testing can be done on the replicated test cases to test various boundaries. These boundaries include 32 byte boundaries, cache line boundaries (128 bytes) and page crossing boundaries. The test case segment is divided into sub-segments of word, double word and quad word and the order of the sub-segments changes for each segment in the test case strand. Dividing into sub-segments and changing of the order of the sub-segments ensures that the data for test cases within the sub-strings can observe and preserve double word and quad word boundaries where needed. Using non-naturally aligned data boundaries with replicated code ensures that all types of segments will cross the boundaries at some replication of the test data. This allows testing of the boundaries without using special code to look at the restrictions of a particular segment for each of the boundaries.

The examples described above illustrate a preferred test case segment with 7 words to achieve non-naturally aligned data boundaries. Other non-naturally aligned data boundaries could include other odd numbers such as 5, 9, 11, 13, 15, etc. A combination of word, double word and quad word could be chosen as sub-segments for these segments similar to the described example. For example, for a segment with 9 words, a quad word, two double words and a word would achieve the correct number of sub-segments for 9 words. The sub-segments could be changed for each segment in a strand as described above for the 7 word example.

FIGS. 5A-5C illustrate examples of testing speculative instruction execution in a processor with test cases placed in test case segments with non-naturally aligned data boundaries. The examples use four test case segments. For illustration purposes, the four test case segments 410A, 410B, 412A and 412B in the examples correspond to test case segments in FIG. 3. Further, in the examples, test case segments tc0-1 410A, and tc1-1 410B each have test case code. Test case segments tc0-2 412A and tc1-2 412B are loaded with data. In the examples described below, branches in the test code branch from a first segment to an adjacent segment. This particular arrangement is for a simple illustration of the invention. In practice the mixture of test code and test data in the segments may vary and the code may branch to other segments or within a segment.

FIG. 5A illustrates a first example of testing speculative instruction execution in a processor with test cases placed in test case segments with non-naturally aligned data boundaries. In this example, the code in segment tc0-1 410A includes a branch instruction 510. If the branch of branch instruction 510 is taken 512, then the processor will continue execution at the beginning of the test segment tc0-2 410B. If the branch of branch instruction 510 takes the predicted path 516 then the processor would continue execution at the beginning of tc1-1 412A. In this example, the branch instruction 510 is a conditional branch that branches or does not branch based on the random condition value 220 shown in FIG. 2. In this example, the random condition value 220 is given a random content in any appropriate manner. The branch instruction 510 may further have a hint bit set within the instruction that tells the processor not to branch but take the mispredicted path 516 (this process is described further below). The combination of a random branch and a hint bit indicating not to branch will insure that the processor at times predict that branch will not be taken but in fact the branch will be taken. When the processor mispredicts the branch will not be taken 516, the processor instruction pipeline will speculatively try to execute the data in segment tc1-1 412A as if it were code. This will result in errors if the pipeline continues with execution of the data. When the processor determines that the branch will actually be taken, the processor must flush the errors from trying to erroneously execute the data. If the errors remain after the branch is taken, the test code can detect these errors as problems with the processor that didn't properly flush out speculative execution of the predicted pipeline. Thus the test case tests the processor's ability to flush the pipeline for a conditional branch. If errors are encountered when executing this test case, a potential problem with the processor 216 being tested can be flagged.

In the example shown in FIG. 5A, data in segment tc1-1 412A was speculatively executed as code in the mispredicted branch. As described above, this would result in errors. If the speculatively executed data were not properly flushed by the processor when the processor determines the branch will not be taken, these errors would remain after flushing the pipeline and can be used to determine and report if the processor is properly handling speculative execution. In addition to placing data where the speculative execution will occur, the memory contents of the location that is speculatively executed by the processor may be loaded with bad code that will cause a specific error, or test code that will cause a detectable result if the pipeline is not properly flushed.

FIG. 5B illustrates another example of testing speculative instruction execution in a processor with test cases placed in test case segments with non-naturally aligned data boundaries. This example is similar to the previous example except that the conditional branch branches to the same segment. In this example, the code in segment tc0-1 410A includes a conditional branch instruction 520 and a non-conditional branch instruction 522. The non-conditional branch 522 branches to the next segment 410B. If the branch instruction 520 is taken 524, then the processor will continue execution at the non-conditional branch 522. If the branch of branch instruction 520 takes the predicted path then the processor will continue execution with the code 526 following the branch instruction 520. As in the previous example, the branch instruction 520 is a conditional branch that branches or does not branch based on the random condition value 220 shown in FIG. 2 having a random content. The branch instruction 520 may further have a hint bit set within the instruction that tells the processor not to branch but take the mispredicted path to execute the code 526. The combination of a random branch and a hint bit indicating to not branch will ensure that the processor at times predict that branch will not be taken but in fact the branch will be taken. When the processor mispredicts the branch will not be taken, the processor instruction pipeline will execute the code 526 following the branch 520. This code 526 may include error detection code or code that will create an error. Similar to the previous example, when the processor determines that the branch will actually be taken, the pipeline is flushed including the errors or changes made by the test code 526. If the errors remain after the branch is taken, the test code can detect these errors as problems with the processor that didn't properly flush out the predicted pipeline.

FIG. 5C illustrates another example of testing speculative instruction execution in a processor with test cases placed in test case segments with non-naturally aligned data boundaries. This example is similar to the first example except that the branch is in the middle of the segment and the predicted branch leads to bad code in the same segment. In this example, the code in segment tc0-1 410A includes a conditional branch instruction 530 in the middle of the segment 410A. When the branch instruction 530 is taken 532, then the processor will continue execution at the next segment 410B. The mispredicted path 534 of the branch instruction 530 leads to the test code or bad code 536. As in the previous examples, the branch instruction 530 is a conditional branch that branches or does not branch based on the random condition value 220 shown in FIG. 2 having a random content. The branch instruction 530 may further have a hint bit set within the instruction that tells the speculative execution of the processor to not branch but take the mispredicted path 534 to execute the bad code 536. The combination of a random value for the conditional branch and a hint bit indicating to not branch will ensure that the processor at times mispredict that branch will not be taken but in fact the branch will be taken. When the processor predicts the branch will not be taken, the processor instruction pipeline will execute the code 536 following the branch 530. This code 536 may include error detection code or code that will create an error. Similar to the previous example, when the processor determines that the branch will actually be taken, the processor must flush the errors or changes made by the bad code 536. If the errors remain after the branch is taken, the test code can detect these errors as problems with the processor that didn't properly flush out the predicted pipeline.

FIG. 6 illustrates an example of test code for a test case to test speculative execution. Segments 410A, 412A and 410B are shown with additional detail of the test case data and code to further illustrate the above example in FIG. 5A. In this example, segment 410A is shown with five instructions followed by the branch instruction 510. Instruction5 610 loads a random condition value 220 into register1 of the processor. The random condition value 220 is continuously changed in a pseudo random manner so that the speculative execution hardware of the processor is not able to accurately predict whether the branch will be taken or not. Instruction5 610 loads the random condition into register1 just prior to the branch instruction 510. The branch instruction is coded such that it will always branch 512 to locationA 612. Branch instruction 510 contains a hint bit 222 that hints that the branch instruction 510 will not take the branch 512 but will take a mispredicted path 514 and continue speculative execution with the next location, which in this example is data in segment 412A. The random condition value 220 and the hint bit 222 together cause the speculative execution hardware of the processor to speculatively execute data in segment 412A. When the branch instruction 510 determines to actually take the branch 512 to locationA 612, the processor hardware should flush all results from the execution of the data 412A including any errors from speculatively executing data in segment 412A as code. If the errors remain after the branch is taken, the test code can detect these errors as problems with the processor that didn't properly flush out the predicted pipeline. The test code represented by instr6 through instr13 in segment 410B may be used to test whether the speculative instruction (in this case data 412A) were properly flushed from the predicted pipeline. Alternatively, interrupts or other code may be used to check for errors as known in the prior art.

Referring to FIG. 7, a method 700 shows one suitable example for testing speculative instruction execution in a processor with test cases placed in test case segments with non-naturally aligned data boundaries. Portions of method 700 are preferably performed by the test case generator 123 shown in FIG. 1, the test case executor 214 shown in FIG. 2 and the processor as it executes the test case code in the test case segment. First, place test cases in segments of a memory or cache where the segments have non-naturally aligned boundaries (step 710). Next, execute the test case to cause the processor to speculatively execute code with a branch instruction in the test segments with non-naturally aligned data boundaries (step 720). Determine if the processor hardware properly flushed instructions from the speculatively executed locations when the branch is mispredicted and not taken (step 730). Method 700 is then done.

FIG. 8 shows one suitable example of a method 800 for running test code on the consecutive slices of data with non-naturally aligned boundaries by branching back to rerun the test code on the consecutive test data slices. Method 800 thus shows a suitable method for performing step 730 in method 700. First, load a register with a pseudo random value (step 810). Use a hint bit in the test case code to hint hardware to take the wrong branch direction, meaning to hint at taking the branch opposite to the direction that the branch will actually take (step 820). Then conditionally branch based on the random register opposite to the hint (step 830). The method 800 is then done.

The disclosure and claims herein relate to test cases replicated into a memory segments with non-naturally aligned data boundaries to test speculative execution of branches by the processor. The test case includes a branch with a hint bit set to cause the hardware to mispredict the path of the branch to cause speculative execution of test code, bad code or data. The processor can then be tested to see if it properly flushes the speculative code execution upon taking the opposite branch of the mispredicted path One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus for testing a computer processor comprising:
   a test case generator that allows a user to create test cases with test code and test data;
   a test case executor that replicates the test case and loads the replicated test case into non-naturally aligned segments of consecutive memory locations of a memory;
   wherein a test case is loaded into a first segment, wherein the test case includes a branch instruction that branches to a subsequent segment of the non-naturally aligned segments; and
   wherein the computer processor executes the test code in the test case and the processor mispredicts the branch and speculatively executes memory contents at a location that will not be taken by the branch.

2. The apparatus of claim 1 wherein the branch instruction further comprises a hint bit that hints to the processor to mispredict the branch to the location that will not be taken.

3. The apparatus of claim 1 wherein the memory contents of the location that is speculatively executed by the processor contains at least one of the following: bad code, test code and data.

4. The apparatus of claim 3 wherein the bad code, test code and data cause the processor to produce detectable errors that can be detected when the processor does not properly flush speculative execution of the respective bad code, test code and data.

5. The apparatus of claim 1 wherein the test case loaded in the first segment comprises seven words of test code including an instruction to load a random value into a register and a branch instruction that always branches to a subsequent segment of the plurality of segments based on the random value in the register that prompts the processor to mispredict the branch instruction.

6. The apparatus of claim 1 wherein the plurality of segments have seven words of memory for the test case.

7. The apparatus of claim 6 wherein each segment has one single word sub-segment, one double word sub-segment and one quad word sub-segment.

8. The apparatus of claim 1 wherein the plurality of segments have a number of words chosen from the following: 5, 9, 11, 13 and 15.

9. A computer-implemented method executed by at least one processor for testing a computer processor comprising:
   providing a test case comprising test code and test data stored in a plurality of segments with non-naturally aligned boundaries in a memory;
   placing multiple instances of the test case into consecutive memory locations in the memory;
   executing a branch instruction in the test code branching from a first segment to a second segment; and
   determining if hardware of the processor properly flushed the results of speculatively executing instructions when the processor mispredicts the branch and speculatively executes memory contents at a location that will not be taken by the branch.

10. The method of claim 9 wherein the step of determining if hardware of the processor properly flushed instructions further comprises:
    loading a register with a pseudo random value;
    using a hint bit in the test code to hint to hardware to take the wrong branch; and conditionally branch based on the register opposite to the hint bit.

11. The method of claim 9 wherein the memory contents of the location that is speculatively executed by the processor contains at least one of the following: bad code, test code and data.

12. The method of claim 11 wherein the bad code, test code and data cause the processor to produce detectable errors that can be detected when the processor does not properly flush speculative execution of the respective bad code, test code and data.

13. The method of claim 9 wherein a test case loaded in a first segment comprises seven words of test code including an instruction to load a random value into a register and a branch instruction that always branches to a subsequent segment of the plurality of segments based on the random value in the register that prompts the processor to mispredict the branch instruction.

14. The method of claim 9 wherein the plurality of segments have seven words of memory for the test case.

15. The method of claim 9 wherein each segment has one single word sub-segment, one double word sub-segment and one quad word sub-segment.

16. The method of claim 9 wherein the plurality of segments have a number of words chosen from the following: 5, 9, 11, 13 and 15.

17. A computer-implemented method executed by at least one processor for testing a computer processor comprising:
providing a test case comprising test code and test data stored in a plurality of segments with non-naturally aligned boundaries in a memory;
placing multiple instances of the test case into consecutive memory locations in the memory;
executing a branch instruction in the test code branching from a first segment to a second segment;
determining if hardware of the processor properly flushed instructions when the processor mispredicts the branch and speculatively executes memory contents at a location that will not be taken by the branch;
wherein the step of determining if hardware of the processor properly flushed instructions further comprises:
loading a register with a pseudo random value;
using a hint bit in the test code to hint to hardware to take the wrong branch; and
conditionally branch based on the random register opposite to the hint bit.

18. The method of claim 17 wherein the memory contents of the location that is speculatively executed by the processor contains at least one of the following: bad code, test code and data.

19. The method of claim 18 wherein the bad code, test code and data cause the processor to produce detectable errors that can be detected when the processor does not properly flush speculative execution of the respective bad code, test code and data.

20. The method of claim 17 wherein a test case loaded in a first segment comprises seven words of test code including an instruction to load a random value into a register and a branch instruction that always branches to a subsequent segment of the plurality of segments based on the random value in the register that prompts the processor to mispredict the branch instruction.

* * * * *